US010160207B2

(12) United States Patent
Rijfers et al.

(10) Patent No.: US 10,160,207 B2
(45) Date of Patent: Dec. 25, 2018

(54) PRINT HEAD FOR PRINTING A SUSPENSION FLUID COMPRISING PARTICLES, PRINTING APPARATUS AND METHOD

(71) Applicant: Nederlandse Organisatie voor toegepast-natuurwetenschappelijk onderzoek TNO, 's-Gravenhage (NL)

(72) Inventors: Andries Rijfers, 's-Gravenhage (NL); René Jos Houben, 's-Gravenhage (NL); Robin Bernardus Johannes Koldeweij, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/522,129

(22) PCT Filed: Oct. 29, 2015

(86) PCT No.: PCT/NL2015/050753
§ 371 (c)(1),
(2) Date: Apr. 26, 2017

(87) PCT Pub. No.: WO2016/068706
PCT Pub. Date: May 6, 2016

(65) Prior Publication Data
US 2017/0334201 A1    Nov. 23, 2017

(30) Foreign Application Priority Data
Oct. 29, 2014  (EP) .................................... 14190858

(51) Int. Cl.
*B41J 2/14*      (2006.01)
*B29C 64/112*   (2017.01)
(Continued)

(52) U.S. Cl.
CPC .............. *B41J 2/14* (2013.01); *B29C 64/112* (2017.08); *A23P 30/20* (2016.08); *A23P 2020/253* (2016.08); *A23V 2002/00* (2013.01)

(58) Field of Classification Search
None
See application file for complete search history.

(56) References Cited

U.S. PATENT DOCUMENTS

2012/0113197 A1  5/2012  Kashu et al.
2014/0071202 A1  3/2014  Kim et al.

FOREIGN PATENT DOCUMENTS

CN    202608253 U    12/2012
WO    00/38928       7/2000

OTHER PUBLICATIONS

Shear Rate article by Instron, retrieved on Mar. 4, 2018, entire document.*

(Continued)

*Primary Examiner* — Lisa M Solomon
(74) *Attorney, Agent, or Firm* — Hoffmann and Baron, LLP

(57) ABSTRACT

The invention is directed at a print head for printing a suspension fluid. The print head comprises a nozzle having one or more nozzle outlets for allowing the suspension fluid to be ejected from the nozzle, a flow path including a supply channel for supplying the suspension fluid to the one or more nozzle outlets, and a supply pump for establishing a flow within the flow path. The nozzle further comprises an actuator for imparting pressure fluctuations on the suspension fluid at the one or more nozzle outlets for generating a stream of droplets therefrom. The flow path further comprises a shear section for locally increasing the shear rate at least at a location in the flow path upstream of the one or more nozzle outlets. The flow path further includes a return channel for allowing excess fluid not ejected from the nozzle (Continued)

Figure 3A:
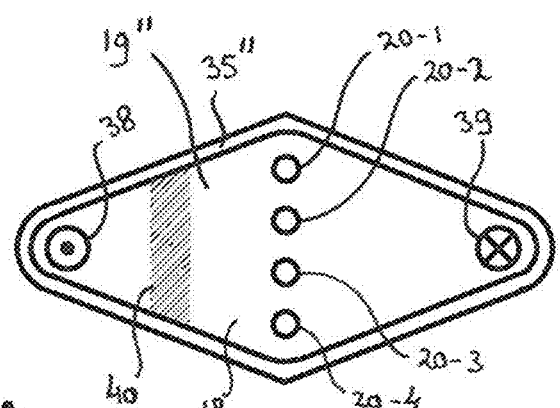

to flow away from the one or more nozzle outlets. The shear section is configured to locally increase the shear rate to be larger than a shear rate obtained near at least one of the one or more nozzle outlets. The invention is further directed at a printing apparatus, a method of printing, and a method of manufacturing a print head.

20 Claims, 7 Drawing Sheets

(51) Int. Cl.
*A23P 20/25* (2016.01)
*A23P 30/20* (2016.01)

(56) References Cited

OTHER PUBLICATIONS

Viscosity article by Wikipedia, retrieved on Mar. 4, 2018, Paragraph 0001.*
IP.com search.*
Valdes, Julio R., and J. Carlos Santamarina. "Particle clogging in radial flow: Microscale mechanisms." SPE Journal 11.02 (2006): 193-198.

* cited by examiner

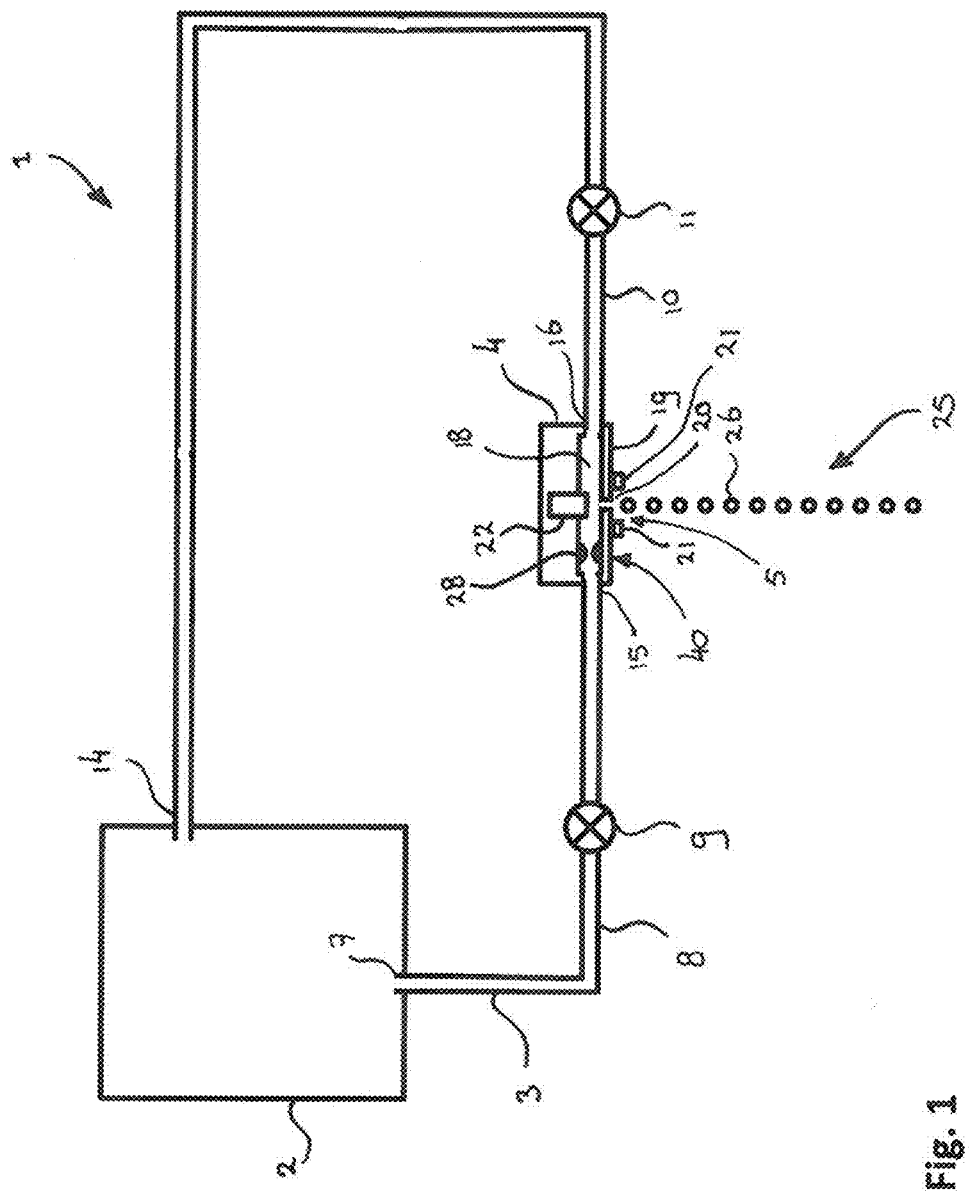

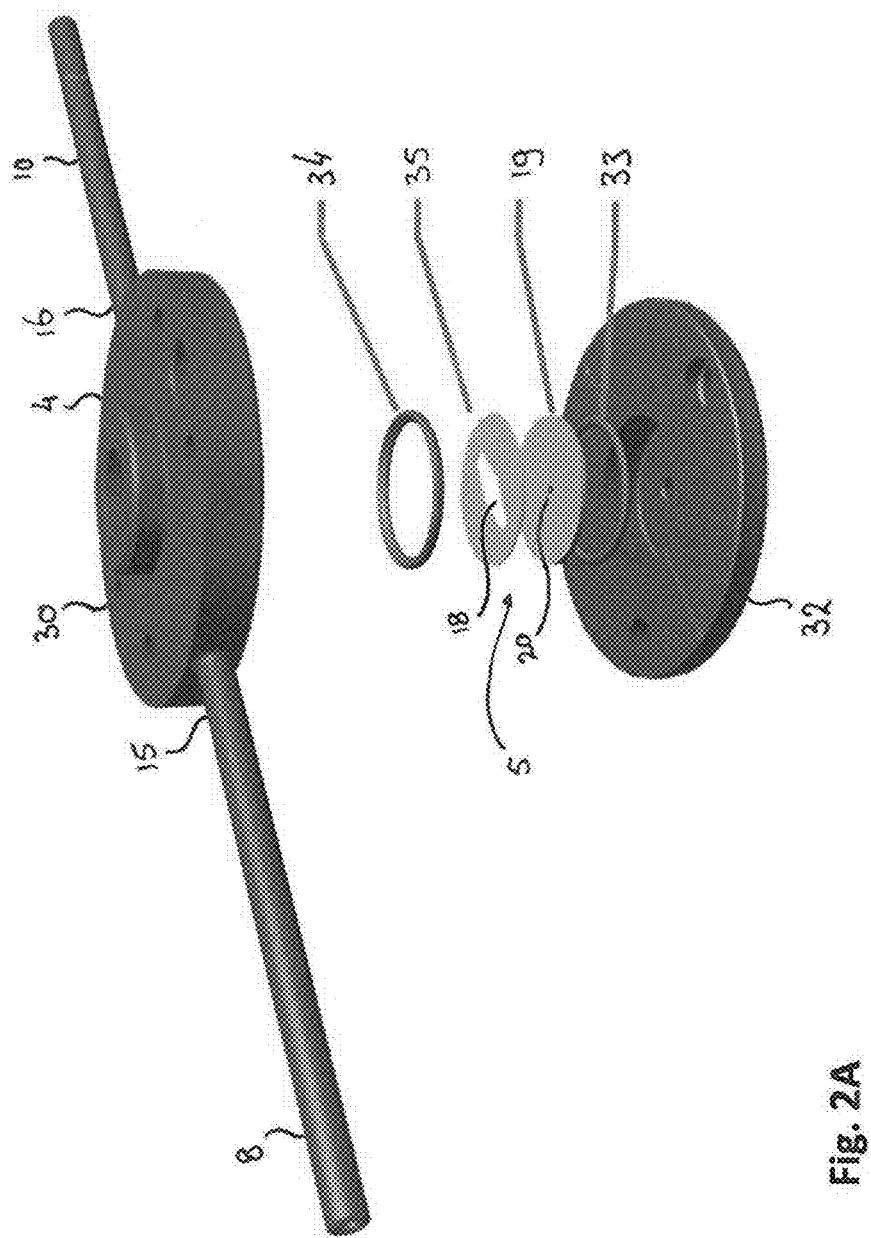

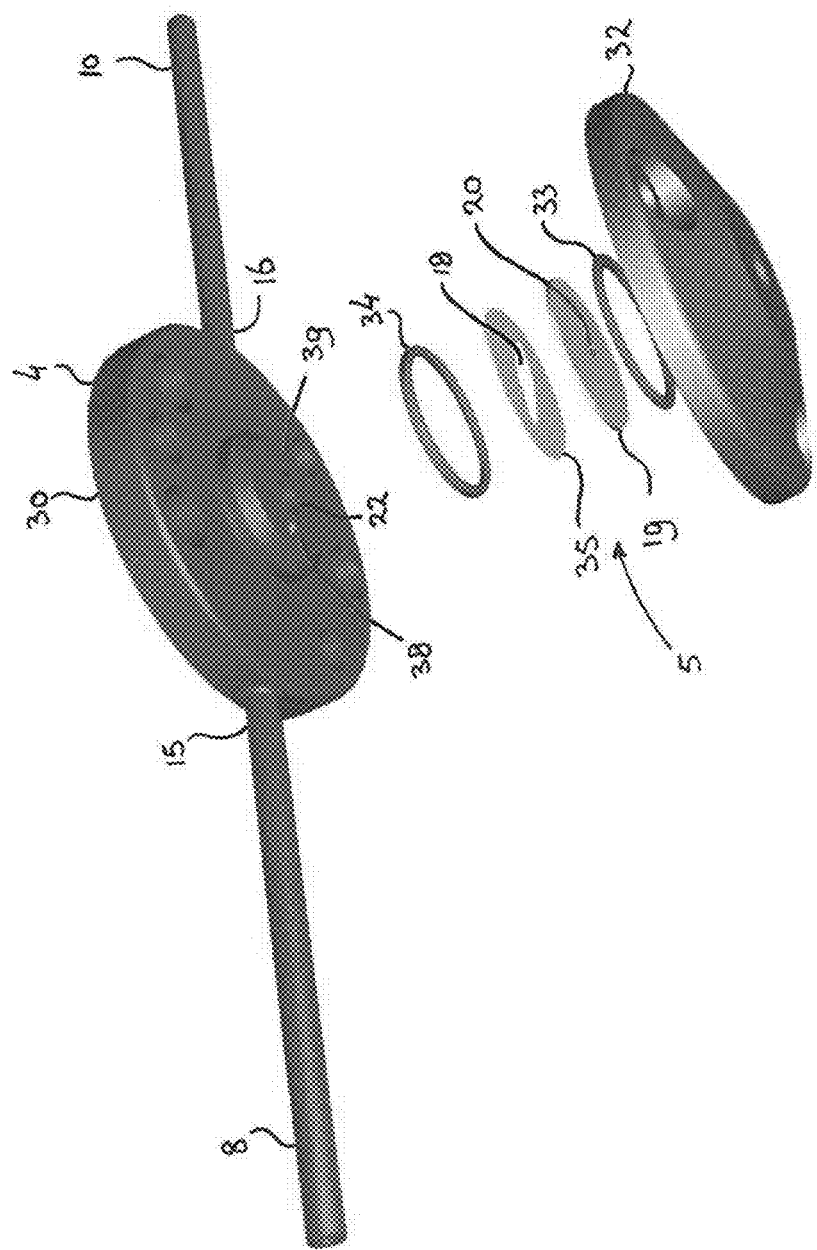

PRINT HEAD FOR PRINTING A SUSPENSION FLUID COMPRISING PARTICLES, PRINTING APPARATUS AND METHOD

This application is the U.S. National Phase of, and Applicants claim priority from, International Patent Application Number PCT/NL2015/050753 filed 29 Oct. 2015, which claims priority from EP 14190858.2 filed 29 Oct. 2014, each of which is incorporated herein by reference.

FIELD OF THE INVENTION

The present invention is directed at a print head for printing a suspension fluid, the print head comprising a nozzle having one or more nozzle outlets for allowing the suspension fluid to be ejected from the nozzle, a flow path including a supply channel for supplying the suspension fluid to the one or more nozzle outlets, and a supply pump for establishing a flow within the flow path. The invention is further directed at a printing apparatus comprising such a print head, to a method of printing suspension fluids, and to a method of manufacturing a print head.

BACKGROUND

A recent development in the field of three dimensional printing technology is the application 3D printing to the printing of food. For printing food, the printed fluid will in many cases comprise a suspension fluid, i.e. a fluid comprising particles of an edible substance. However, not confined to the area of 3D printing of foods, the printing of suspension fluids is applicable in many other areas wherein arbitrary materials need to be printed (e.g. metals, organic materials, ceramics). For example, it is likewise applicable in the fields of pharmaceutics, printed electronics, or the printing of multi-material structures, and may generally be applied in spray drying applications for creating powders.

Efficient printing requires the use of highly filled suspension fluids, i.e. suspension fluids having a relative large particle density. However, a disadvantage of the printing of such highly filled suspensions is the clogging of printing nozzles. A too large particle size does not completely explain this problem. Even with highly filled suspensions of small particles (relative to the diameter of the nozzle outlet), clogging is experienced. In an industrial printing process, each clogging event requires intervention and maintenance, thereby interrupting the process and lowering the yield.

To overcome clogging, some solutions rely on filtration of larger particles using a filter. However, the use of filters is itself not desirable in industrial processes, because such filters require to be cleaned or replaced often during operation. Moreover, as noted, clogging is experienced even with suspensions of small particles.

SUMMARY OF THE INVENTION

It is an object of the present invention to provide a method and device for printing suspension fluids, wherein the abovementioned disadvantages have been overcome, which is reliable and provides for a stable droplet flow useable for printing.

To this end, in accordance with a first aspect of the invention, there is provided a print head for printing a suspension fluid comprising particles, the print head comprising a nozzle having one or more nozzle outlets for allowing the suspension fluid to be ejected from the nozzle, a flow path including a supply channel for supplying the suspension fluid to the one or more nozzle outlets, and a supply pump for establishing a flow within the flow path, wherein the nozzle further comprises an actuator for imparting pressure fluctuations on the suspension fluid at the one or more nozzle outlets for generating one or more droplets therefrom, wherein the flow path further comprises a shear section for locally increasing the shear rate at least at a location in the flow path upstream of the one or more nozzle outlets, and a return channel for allowing excess fluid not ejected from the nozzle to flow away from the one or more nozzle outlets, wherein the shear section is configured to locally increase the shear rate for imposing a shear force on said particles which is larger than an attractive force between said particles in a particle agglomeration.

The invention is based on the insight that clogging is primarily caused by bridge formation of particles within the suspension fluid. Bridge formation is the phenomenon of particles in the flow becoming entangled or hooked to each other in such a manner that they span the diameter of the nozzle outlet, i.e. forming a bridge. As a result of the bridge formation, the nozzle will become clogged. This problem is likely to occur with suspension fluids comprising large particles, and may therefore expectedly be diminished by making the outlet opening of the nozzle larger. However, this would likewise increase the flow through the nozzle outlet, resulting in larger droplets (which is in many cases not desired).

Moreover, enlarging the nozzle outlet is also not sufficiently effective to resolve the problem. It has been found that suspension fluids with small particles may likewise clog the nozzle, and bridge formation alone does not explain this. Further underlying the present invention, is the insight that the effect of bridge formation is worsened by agglomeration of particles within the suspension, which particularly occurs in case the suspension fluid is given the opportunity to settle. Attractive forces between the particles, such as the Van der Waals forces, cause the particles to form particle agglomerations. Therefore, even with small particles, clogging may occur.

The distinguishing features of the present invention resolve the above problems by increasing the shear within the flow at least prior to the nozzle outlet. By increasing the shear, pulling forces within the flow acting on the agglomerations will cause the agglomerations to break, thereby separating the particles. The absence of agglomerations effectively prevents bridge formation. However, to increase the shear rate sufficiently in the supply to the nozzle, the dimensions of the flow path before the nozzle must locally become so small that the problem of clogging shifts to the location of the reduced channel size. As a result, increasing the shear rate without taking any other measures merely moves the problem of bridge formation to the flow path before the nozzle outlet. Therefore, in accordance with the present invention, in addition to increasing the shear rate, a return flow path has been provided for removing excess fluid away from the nozzle. As a result of the return path, the flow rate in the supply channel of the flow path can be larger than the flow rate through the one or more nozzle outlets. This larger flow rate allows to obtain larger shear forces in the flow before the nozzle outlet, while simultaneously allowing the flow path to have larger dimensions than the nozzle outlet. The clogging of the nozzle is thereby resolved.

The local increase of the shear rate must be at least sufficient to overcome the attractive forces between the particles of an agglomeration. These attractive forces include the Van der Waals forces, which are known to increase linearly with the size of the particles. The shear force exerted by an increased shear rate (e.g. due to a local flow velocity increase) is an inertial force of the flow. Due to a local increase in flow velocity across an agglomeration of particles, on the 'front' side of the agglomeration (i.e. the side facing the flow direction or downstream direction) where the flow velocity is higher, the flow will exert a larger force on the agglomeration than on the 'back' side of the agglomeration (i.e. the side facing the opposite or upstream direction of the flow) where the flow velocity is lower. The agglomeration will experience a net pulling force across its front and back end. If that pulling force is large enough to overcome the Van der Waals forces, the agglomeration will break-up. The shear rate at which this will occur depends on the magnitude of the forces keeping the agglomeration together, and hence is dependent on the properties of the suspension and the particles therein.

The one or more droplets generated, as referred to for the present invention, may usually be a stream of droplets, e.g. in a continuous printing arrangement. A stream may also be generated for providing a drop-on-demand type of system, e.g. in case droplets may thereafter be selectively removed or passed dependent on whether they are to be printed. Of course, alternatively it is also possible to print one or more droplets selectively from the nozzle, e.g. using a suitable actuator, in a drop-on-demand system. In the present disclosure, reference is sometimes made to a 'stream of droplets' or 'droplet stream', however this term may be interpreted broadly such as to include the generating of one or more droplets.

In accordance with an embodiment, the shear section comprises at least one element of a group comprising: a flow constriction; a channel reduction of the supply channel, the channel reduction reducing at least one dimension of the supply channel; a structure present in said supply channel, such as a rim, wall, or protrusion; a bend in the supply channel. Increasing the shear can be established in many different manners, some of which have been identified herein. Other manners to increase the shear rate may likewise be applied with the present teachings to obtain embodiments of the present invention. The different manners of increasing the shear rate that are identified above, have been suggested here because they may be integrated in the design of the print head by proper designing of the shapes and sizes of the supply channel and one or more nozzle outlets, while in principle they do not require additional active components (although it is up to the skilled person to add such components where desired).

Moreover, in accordance with yet a further embodiment, at least one of the one or more nozzle outlets is located in a wall of the supply channel, and wherein the supply channel is connected to the return channel. The advantage of providing the nozzle outlet directly in the flow path in the wall of the supply channel, is that the flow from the supply channel to the return path flows past the outlet. As a result, shear force of the flow passing over the outlet further prevent any pollution or particles from blocking the opening. A slight disadvantage is that this also causes the droplet stream from the nozzle outlet to have a velocity component in the direction of the original flow which in most cases must be compensated. Therefore, in accordance with some embodiments, at least one of the one or more nozzle outlets is located in a wall of a branch channel extending from the supply channel. In such a branch channel, e.g. extending transverse to the supply channel, a shear force of a flow passing over the nozzle outlet will be absent. The branch channel may for example be closed on one end.

In order for the pressure fluctuations imparted by the actuator on the outlet to effectively transfer the fluctuations on the ejected fluid, some room around each one of the one or more nozzle outlets is also desired. The pressure fluctuations are to be advantageously imparted on the ejected fluid with minimum pressure loss (e.g. due to back flow of suspension fluid under influence of the pressure pulses). To this end, the actuator may comprise a suitably shaped focusing member at a suitable distance from the outlet channel. Therefore, in accordance with yet another embodiment, at least one of the one or more nozzle outlets is located in a nozzle chamber which is connected to the supply channel for receiving the suspension fluid, the nozzle chamber comprising the actuator for imparting the pressure fluctuations. The nozzle chamber allows to be suitably shaped and dimensioned in the design. According to some embodiments, the nozzle chamber is connected to the supply channel via a branch channel extending from the supply channel, the nozzle chamber being sized or shaped for imparting said pressure fluctuations. Arranging the nozzle chamber in a branch extending from the supply channel again has the advantage of preventing the ejected droplet stream to have a velocity component in an undesired direction.

In some of the embodiments of the print head described herein above, the branch channel comprising the nozzle outlet, or connecting the nozzle chamber to the supply channel, extends from an inner bend of a bended portion of the supply channel. As a result of this, larger particles or particle agglomerations that inadvertently have not been broken-up by the shear force in the shear section will mostly be conveyed in the flow near the outer bend as a result of centrifugal forces. The flow near the inner bend of the bended portion will therefore mostly carry the smaller separated particles. This will further decrease the chance on clogging of the nozzle outlets.

In accordance with a further embodiment, the nozzle chamber is arranged between an outlet portion of the supply channel and an inlet portion of the return channel. The nozzle chamber could be designed as a separate nozzle chamber with fluid inlets and outlets for connecting with the supply channel and return channel respectively, and may thus have any desired shape and size. However, in accordance with another embodiment, the nozzle chamber is shaped having a broad central section and narrow end sections, wherein each one of the outlet portion of the supply channel and the inlet portion of the return channel is located in a respective end section of the nozzle chamber. For example, the nozzle chamber could be a shaped as chamber having a fixed height rectangular cross section, and having a width that gradually expands as from the location of the outlet portion of the supply channel towards the broad central section, while the width narrows again towards the inlet portion of the return channel. At some location near the outlet portion of the supply channel, the bottom wall of the nozzle chamber could comprise the shear section in the form of a rim or protruded section whereby the flow is locally accelerated creating an increased shear rate that will break-up agglomerated particles. In accordance with yet a further embodiment, multiple of the one or more nozzle outlets may located distributed across the width of the central section; i.e. each outlet providing an ejected stream of droplets for printing.

In accordance with another embodiment of the present invention, the print head further comprises a return pump cooperating with the supply pump for controlling a volumetric flow rate ejected from the one or more nozzle outlets.

By setting the supply pump at a first volumetric flow rate, while setting the return pump at a second volumetric flow rate (smaller than the first volumetric flow rate), the difference will be the volumetric flow rate that must have been forced through the nozzle outlets that are located in between the supply pump and the return pump. This, thereby, allows to control the amount of suspension fluid printed. In an embodiment having multiple nozzle outlets, if one of the outlets for some reason would become clogged anyway (despite the measures taken), the flow rate through the other nozzles can be controlled in this manner.

In another embodiment, the print head further comprises a pressure regulator unit downstream of the nozzle chamber outlet cooperating with the supply pump for controlling a pressure in the nozzle near the one or more nozzle outlets. This embodiment is based on the insight that the amount of printed suspension fluid ejected through the one or more nozzle outlets may also be precisely controlled by setting the pressure in the nozzle near the nozzle outlet (and thereby the pressure drop across the nozzle outlet). Either the flow regulated embodiment or the pressure regulated embodiment, or even a combined implementation allowing both flow and pressure regulation, each have their own advantages in different situations. This is explained further down below.

In accordance with a second aspect thereof, the invention provides a printing apparatus for printing a suspension fluid, the apparatus comprising a print head according to the first aspect, wherein the supply channel of the flow path is connected to a fluid container for receiving the suspension fluid, and wherein the return channel is connected to the fluid container for releasing therein the excess suspension fluid.

Yet in accordance with a third aspect thereof, there is provided a method of printing a suspension fluid using a print head, the print head comprising a nozzle having one or more nozzle outlets, a supply pump, and a flow path comprising a supply channel, the method comprising: supplying, through the supply channel, the suspension fluid to the one or more nozzle outlets, using the supply pump for establishing a flow through the supply channel; ejecting, by the nozzle, the suspension fluid from the one or more nozzle outlets, while simultaneously imparting, by an actuator comprised by the nozzle, pressure fluctuations on the suspension fluid at the one or more nozzle outlets for generating a stream of droplets therefrom, locally increasing the shear rate in the supply channel upstream of the one or more nozzle outlets using a shear section, wherein the shear rate is increased for imposing a shear force on said particles which is larger than an attractive force between said particles in a particle agglomeration, and removing from the one or more nozzle outlets excess fluid not ejected from the nozzle using a return channel.

Moreover, in accordance with a fourth aspect thereof, there is provided a method of manufacturing a print head for printing suspension fluids, the method comprising: providing a nozzle having one or more nozzle outlets for allowing the suspension fluid to be ejected from the nozzle; providing a flow path including a supply channel for allowing supply of the suspension fluid to the one or more nozzle outlets; providing a supply pump for enabling to establish a flow within the flow path; and providing an actuator within the nozzle for enabling to impart pressure fluctuations on the suspension fluid at the one or more nozzle outlets for generating a stream of droplets therefrom; wherein the flow path is provided comprising a shear section for enabling local increasing of the shear rate at least at a location in the flow path upstream of the one or more nozzle outlets, the shear section being configured to locally increase the shear rate for imposing a shear force on said particles which is larger than an attractive force between said particles in a particle agglomeration, and wherein the flow path is further provided comprising a return channel for allowing excess fluid not ejected from the nozzle to flow away from the one or more nozzle outlets.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 1 schematically illustrates a printing apparatus in accordance with the present invention;

FIG. 2A provides a schematic exploded view of a print head in accordance with the present invention;

FIG. 2B provides a schematic exploded view of the print head also illustrated in FIG. 2A from a bottom side;

FIG. 3A schematically illustrates a flow channel and nozzle chamber useable in an embodiment illustrated in FIGS. 2A and B;

FIG. 3B schematically illustrates a cross sectional view of the nozzle chamber of FIG. 3A;

FIG. 4 schematically illustrates an alternative nozzle chamber in accordance with the present invention;

FIGS. 5A and 5B provide, in cross section, a schematic top view and side view of an alternative nozzle in accordance with the present invention;

FIG. 6 schematically illustrates an alternative nozzle in accordance with the present invention;

FIG. 7 schematically illustrates a further alternative nozzle in accordance with the present invention;

FIG. 8 schematically illustrates further alternative nozzle in accordance with the present invention; and FIG. 9 schematically illustrates a flow channel that can be implemented in the embodiment illustrated in FIGS. 2A and 2B, implementing the embodiment of FIG. 8 therein.

DETAILED DESCRIPTION

A schematic illustration of the principles of a printing system or printing apparatus in accordance with the present invention is provided in FIG. 1. The printing apparatus 1 comprises a suspension fluid container 2. The suspension fluid container 2 comprises a suspension fluid which is to be printed using a print head 4 in accordance with the present invention. The suspension fluid may for example comprise a liquid including a suspension of particles. For example, the suspension fluid may be water including a suspension of a food ingredient in the form of particles. Instead of water, a different liquid having a different viscosity and different properties may be applied. For example, the liquid could be an oil having a suspension of the food ingredient. Instead of a food ingredient, the printing apparatus of the present invention may also be used for printing other suspensions, such as a liquid comprising a pharmaceutical component (e.g. a medicine in the form of a powder) or a liquid comprising metal or ceramic particles (e.g. for printing electronic circuits (printable electronics)).

The printing apparatus comprises a flow path 3 including a supply channel 8 and a return channel 10. The supply channel 8 comprises an inlet 7 connecting it to the container 2. The return channel 10 may comprise an outlet 14 for providing excess suspension fluid back to the container 2. A supply pump 9 provides the suspension fluid via the supply channel 8 to the print head 4. Optionally, a return pump 11 draws the flow through the return channel 10 providing it back to the container 2. By regulating the volume metric flow rate through supply pump 9 and return pump 11, the amount of suspension fluid that will be ejected from the print head 4 for printing can be precisely controlled. However, the return pump 11 is optional as printing may also be achieved with embodiments including only a supply pump 9. Instead of using a supply pump 9 and a return pump 11, in an alternative embodiment one of the pumps may be replaced by a different flow regulation element, such as a pressure operated valve, for establishing a flow in the flow path 3 and enabling control of the flow rate of suspension fluid ejected from the print head 4.

The print head 4 is connected to the supply channel 8 via supply inlet 15 and to the return channel 10 via return outlet 16. The print head 4 comprises a nozzle 5 including a nozzle outlet 20. A nozzle chamber 18 in the print head 4 of FIG. 1 is directly connected to the supply inlet 15 on the upstream side and to the return outlet 16 on the downstream side. Alternatively, as will be illustrated further down below, e.g. in connection with FIGS. 6, 7 and 8, the nozzle chamber 18 may be connected to a main channel (reference numeral 17 in FIGS. 6, 7, and 8) via a branch channel 50 extending therefrom.

From the nozzle outlet 20, a stream 25 of droplets 26 will be ejected, e.g. for printing thereof on a substrate (not shown). This droplet ejection may be achieved using an actuator 21 such as a piezo-electric actuator, enabling a periodic deformation of nozzle plate 19 imparting pressure fluctuations on the suspension fluid inside nozzle chamber 18. Optionally, a focus member 22 focuses these pressure fluctuations within nozzle chamber 18 towards the nozzle outlet 20 for effectively forming the droplets 26 at the nozzle outlet 20. Alternatively, it is also possible to impart the pressure fluctuations using a different setup. For example, the focus member 22 may itself be actuated periodically, or may be provided by a suitably shaped part of the wall of the supply channel 8 actuated from the outside to impart pressure fluctuations on the inside within the channel.

In the embodiment illustrated in FIG. 1, a shear section 40 is formed by protrusions 28 (e.g. in the form of knobs, dimples or a rim or other structure) that locally reduce the channel dimensions of the nozzle chamber 18. The shear section 40 is located upstream of the nozzle outlet 20, and locally increases the shear rate of the flow to a level above the shear rate near the nozzle outlet 20. As will be explained below, the combination of shear section 40 upstream of the nozzle outlet 20 with the presence of the return channel 10, effectively prevents clogging of the nozzle outlet 20. This combination allows to locally obtain a large shear rate while due to the presence of the return channel 10 the flow rate through the shear section 40 can be kept much larger than the flow rate through the nozzle outlet 20 alone—thereby enabling the channel dimensions to be maintained much larger than the typical size of particle agglomerations. This prevents clogging of the shear section 40, while the shear section 40 itself prevents clogging of the nozzle outlet 20 by breaking-up the agglomerations.

As described earlier, the local shear force must be at least sufficient to overcome the attractive forces between the particles of the agglomerations. These attractive forces include the Van der Waals forces, which are known to increase linearly with the size of the particles. Due to a local increase in flow velocity across an agglomeration of particles, on the 'front' side of the agglomeration (i.e. the side facing the flow direction or downstream direction) where the flow velocity is higher the flow will exert a larger force on the agglomeration than on the 'back' side of the agglomeration (i.e. the side facing the opposite or upstream direction of the flow) where the flow velocity is lower. The agglomeration will experience a net pulling force across its front and back end. Such a pulling force is also experienced in a bend of the flow, where the flow changes direction. In this latter case, the inertial force pulls the agglomeration towards the change in direction.

If the pulling force is large enough to overcome the Van der Waals forces, the agglomeration will break-up. The shear rate at which this will occur depends on the magnitude of the forces keeping the agglomeration together, and hence is dependent on the properties of the suspension and the particles therein. Channel dimensions and dimensions and shapes of specific structures that form a shear section (such as shear section 40) can thus be modified such as to adapt the teachings of the present invention to be applied to suspension fluids of any type comprising any desired particles. The shear rate required can be determined by balancing the local inertial forces in the shear section in the flow with the attractive forces on the particles. The magnitude of these attractive forces is for example described in "Particle Clogging in Radial Flow: Microscale Mechanisms" by Julio R. Valdes et. al., SPE Journal, Society of Petroleum Engineers, June 2006.

An exploded view of print head 4 is schematically illustrated in FIG. 2A. The print head 4 comprises a top housing section 30 and a bottom housing section 32. Within the housing sections 30 and 32, a plurality of components may be present comprising, as indicated in FIG. 2A, seals 33 and 34, flow channel 35 and nozzle plate 19. The flow channel 35 forms the structure of nozzle chamber 18, and the nozzle plate 19 may comprise the nozzle outlet 20. Nozzle outlet 20 corresponds with a further hole in bottom housing element 32 through which the generated droplets of the suspension fluid are ejected. The number of holes present in the bottom housing element 32 will be dependent on the number of nozzle outlets 20.

A bottom exploded schematic view of the print head 4 illustrated in FIG. 2A is illustrated in FIG. 2B. In FIG. 2B, the bottom side of top housing element 30 is visible which includes, a chamber inlet 38 and a chamber outlet 39 for nozzle chamber 18. Also visible on the top housing element 30 is the location of the focusing member 22 (schematically visualized in FIG. 1) for focusing the pressure fluctuations onto the nozzle outlet 20.

In FIGS. 2A and 2B, the nozzle including the nozzle chamber 18 comprises only a single nozzle outlet 20 in the central part of the nozzle plate 19. To increase throughput, the number of nozzle outlets may be increased (e.g. two, three, four, five, six, etc.) In FIG. 3A, a schematic illustration of a nozzle chamber 18 that may be implemented in the embodiment of FIGS. 2A and 2B is schematically illustrated. FIG. 3A illustrates an alternative flow channel plate 35", and a nozzle plate 19" comprising four nozzle outlets 20-1, 20-2, 20-3 and 20-4. Also illustrated are the nozzle chamber inlet 38 and the nozzle chamber outlet 39.

Figure 3B:
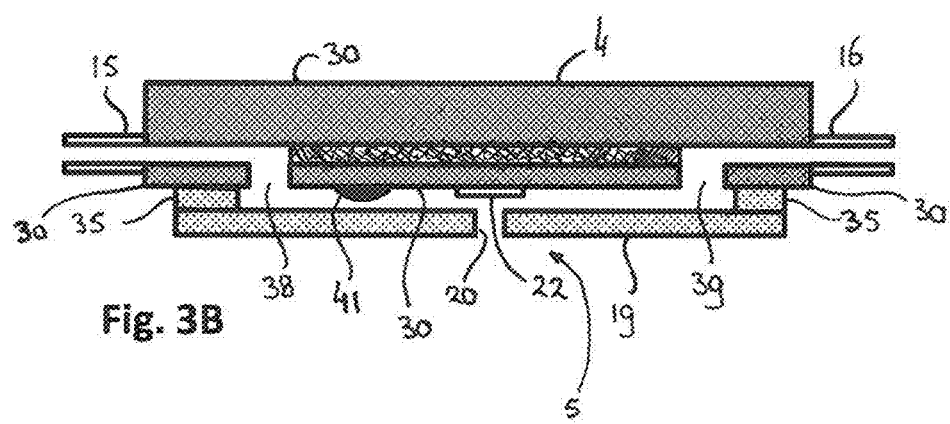

Enlarged and in cross section, the main parts of a print head 4 as illustrated in FIGS. 2A and 2B are schematically illustrated. FIG. 3B illustrates the supply inlet 15 and return outlet 16 of the print head 4. The top housing member 30 comprises nozzle chamber inlet 38 and nozzle chamber outlet 39. In cross section, flow channel plate 35 is schematically illustrated on a stacked configuration between top housing member 30 and nozzle plate 19. Also present on the top housing member 30 is a rim 41 which stretches across the width of the nozzle chamber 18. The rim 41 locally increases the shear rate of the flow considerably such as to break up agglomerations of particles in the suspension fluid. As a result, droplets can be effectively ejected from the nozzle outlet 20 without the nozzle 5 becoming clogged. As a result of the implementation of both a supply channel 8 and a return channel 10, the volume metric flow rate of the flow path in general can be much larger than the volume metric flow rate through the nozzle outlets 20 of the nozzle 5. As a result, the shear rate in the flow can be increased locally without having to decrease the dimensions of the flow path 3 at the shear section 40 formed by the rim 41 to such an extend that the flow path itself may become clogged. Bridge formation of particle agglomerations is effectively prevented, and due to the fact that the particle agglomerations are broken up upstream of the nozzle outlet 20, no bridge formation will take place across the nozzle outlet 20. This effectively prevents the clogging.

Figure 4:
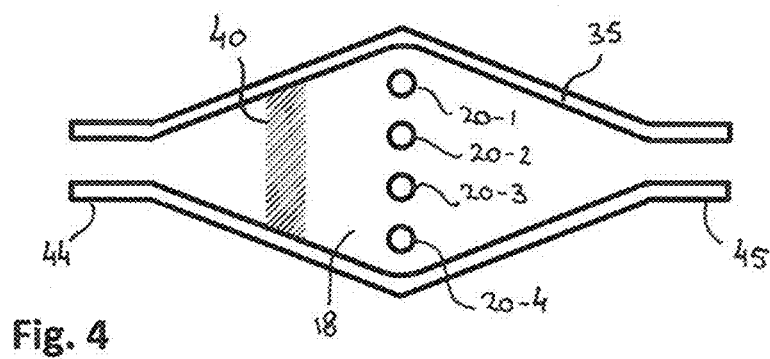

A further embodiment of the present invention is illustrated in FIG. 4. FIG. 4 schematically illustrates a nozzle chamber 18 comprising a shear section 40 and four nozzle outlets 20-1 through 20-4. The difference with the embodiment of FIG. 3A is that in FIG. 4 the chamber inlet 44 and the chamber outlet 45 is arranged in the direction of the flow thereby preventing sharp bends in the flow and potential death spaces. As may be appreciated, to prevent dead spaces and undesired vortices in the flow, all bends may be flattened and any sharp edges may be smoothed, e.g. by providing curved edges.

Figure 5A:
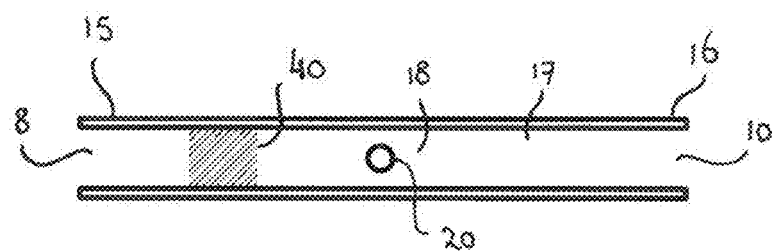
Figure 5B:
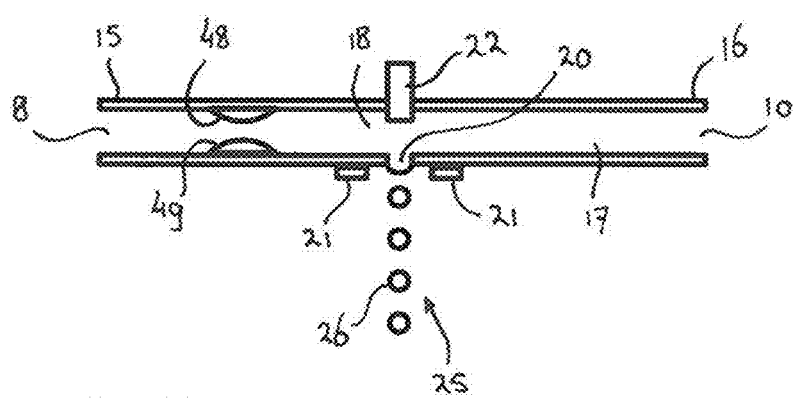

In accordance with a further embodiment of the present invention, the print head 4 may simply include a flow channel going from the supply channel 8 towards the return channel 10, as illustrated in FIG. 5A. In between the supply inlet 15 and the return outlet 16, a shear section 40 may be arranged upstream of the nozzle outlet 20. The nozzle outlet 20 may simply be found as a small hole in the middle of the channel. FIG. 5B shows a cross sectional side view of the embodiment of FIG. 5A. In FIG. 5B, it can be seen that the shear section 40 is formed of a double rim 48, 49 in the top and bottom part of the channel. The double rim 48, 49 forms a flow constriction which locally increases the shear rate of the flow. Using the piezo-electric actuator 21 and the focus member 22 (or an alternative thereof as indicated in relation to FIG. 1), a stream 25 of ejected droplets 26 can be effectively formed.

Figure 6:
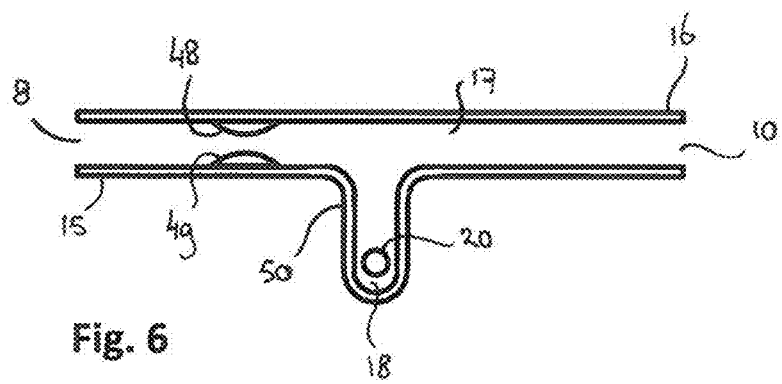

In yet another embodiment of the present invention illustrated in FIG. 6, the outlet 20 is located in a side branch 50 of the channel. The side branch 50 extends from the main channel 17 that extends between the supply inlet 15 and return outlet 16 of the print head 4. The branch 50 extends from side of channel 17 and comprises the nozzle outlet 20 near its death end, i.e. the nozzle chamber 18 is formed by the dead end of the branch 50. The advantage of locating the nozzle outlet 20 in a side branch 50 (or at least not in the main channel 17) is that the main flow through the channel 17 will not directly flow over the nozzle outlet 20. The slight disadvantage of the embodiment illustrated in FIG. 5A, wherein the nozzle outlet 20 is located in the main channel 17, is that the main flow which flows over the nozzle outlet 20 provides a sideways impulse to the droplets 26 and thereby creates a sideways velocity component (in the direction of the main flow) on the egress droplets 26. Therefor, although this is not indicated in FIG. 5B, the egress droplets 26 may be ejected under a slight angle to the right of FIG. 5B. In the embodiment of FIG. 6, because the main flow between the supply inlet 15 and the return outlet 16 will not pass over the nozzle outlet 20, droplets ejected from the nozzle outlet 20 will not be deflected.

Figure 7:
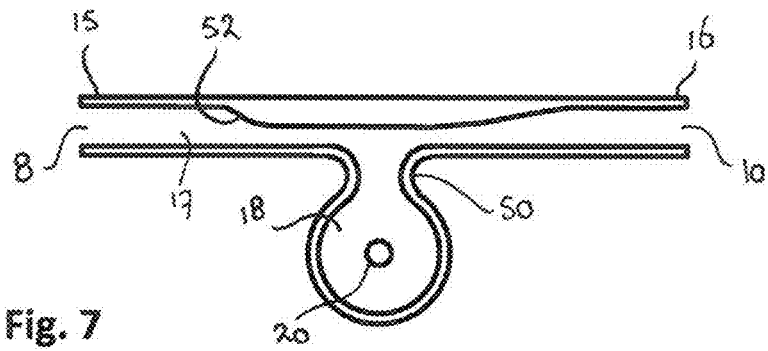

A further embodiment is illustrated in FIG. 7. In FIG. 7 the shear section is formed by thickened portion 52 of the wall of the main channel between supply inlet 15 and return outlet 16, which locally reduces the channel dimensions and thereby increases the sear rate. A side branch 50 of the main channel 17 connects the main channel 17 to a nozzle chamber 18 comprising the nozzle outlet 20. The main advantage of the embodiment of FIG. 7 is that the nozzle chamber 18 provides additional space around the nozzle outlet 20 for allowing the pressure fluctuations to be effectively imparted on the nozzle outlet for forming the droplets 26. This improves operating conditions by reducing forces on the nozzle plate 19 and reducing wear of the active components of the nozzle 5 over time.

Figure 8:
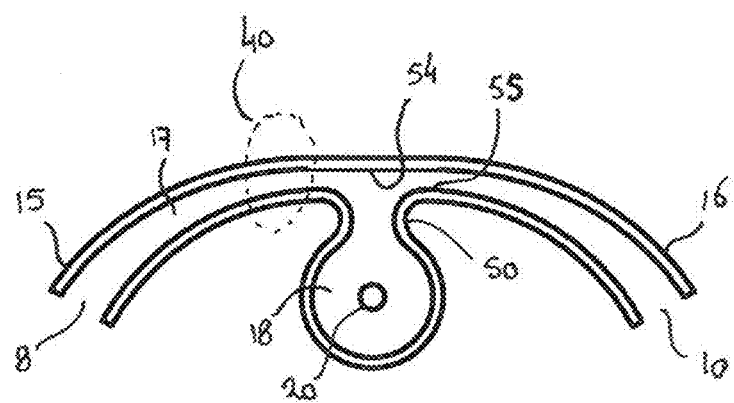

In the embodiment of FIG. 8, the nozzle chamber 18 is also connected to the main channel between the supply inlet 15 and the return outlet 16 by means of a side branch 50. The branch 50 is located on the inner bend 55 of a bended section of the flow channel. The shear section 40 is simply created by a reduction of the channel dimensions of main channel 17 as illustrated: walls of the channel 17 are tapered across the bend for forming the shear section 40. The advantage of providing the side branch 50 in the inner bend section of the embodiment of FIG. 8 is that in case any particle agglomerations still exist in the suspension fluid flowing through the main channel 17, these particle agglomerations will primarily be conveyed by the flow in the outer bend 54 as a result of centrifugal forces. Smaller particles i.e. the particles of the agglomerations that are broken up by means of the increased shear rate, will travel on the inner bend and reach the nozzle chamber 18.

Figure 9:
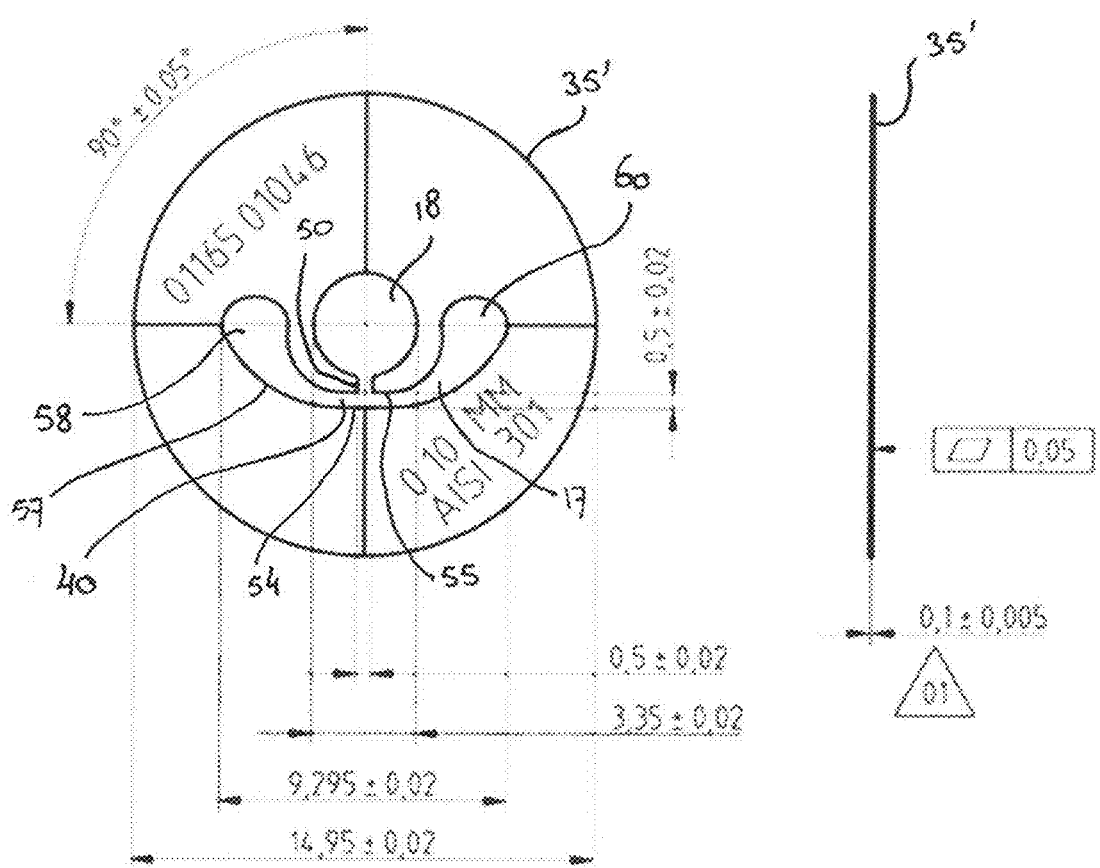

In implementation of the embodiment of FIG. 8 into the arrangement illustrated in FIGS. 2A and 2B is illustrated in FIG. 9. FIG. 9 illustrates a flow channel plate 35' and its' dimensions given in mm. The flow channel plate 35' comprises a cut-out portion 57 that provides for the nozzle chamber 18 and a main channel 17 between nozzle chamber inlet 58 and nozzle chamber outlet 60. The shear section 40 is provided by a reduction of the main channel 17 across the bend. The inner bend 55 and the outer bend 54 are indicated in FIG. 9, as is the side branch 50 of the main channel 17 towards the nozzle chamber 18. On the right side of FIG. 9, the thickness of flow channel plate 35' is indicated in cross section.

The diameter of the nozzle chamber 18 is 3.35 mm having a height of 0.1 mm indicated by the thickness of the flow channel plate 35'. The width of the side branch 50 and the smallest section of the main channel 17 at shear section 40 is 0.5 mm (at a height of 0.1 mm). In total, the diameter of the flow plate 35' is 14.95 mm. Different thicknesses of the main channel 17 were tested at various flow rates using a 'blank nozzle' (i.e. a 'nozzle' without a nozzle outlet 20), to determine favorable channel dimensions. The tested thicknesses of main channel 17 are indicated herewith in micrometers: 200 μm, 250 μm, and 300 μm. The flow rates used were ~22.3 ml/minute, ~15.6 ml/minute, and ~7.8 ml/minute. Acceptable operation without excessive pressure fluctuations within the channel 17 was obtained at channel thicknesses larger than 250 μm, and the pressure became stable at an even preferred channel thicknesses of 300 μm and larger. The measured channel pressures were between 0.5 bar and 1.5 bar. Using a nozzle 5 with a diameter of the nozzle outlet 20 being 150 µm, for printing a suspension fluid consisting of a weight percentage of 35% calcium citrate (the particles having a typical size of ~12 µm), resulted in a stable flow without clogging at a pressure of approximately 1.8 to 1.9 bar. The flow rate through the nozzle was 10 ml/minute, providing a stable jet throughout the experiment. Droplets were generated at a frequency of 8.5 kHz. The droplet size of the droplets 26 in stream 25 was sufficiently small, while the flow rate through the flow path 3 could be kept large enough to prevent clogging of the either the shear section 40 or the nozzle outlet 20—without having to apply filtration means. The experiment was stopped after 23 minutes, without any clogging having occurred.

In the embodiments described, the location of the shear section is upstream of the nozzle outlets, because the agglomerations are to be broken-up before reaching the nozzle outlets. Ideally, the shear section is located in proximity of the nozzle outlet. At least, the shear section is located at a distance upstream of the nozzle which in view of the other flow parameters (velocity, suspension properties, particle properties) is not too far removed from the nozzle outlet to allow reformation of agglomerations in the flow between the shear section and the nozzle outlet. Therefore, the shear section in the embodiments illustrated is located in proximity of the nozzle outlet. As may be appreciated, additional shear sections may be included in parts of the print head that are sensible to clogging as well.

Herein above, it has been suggested to optionally include a return pump 11 in the return channel 10. The optional return pump 11 draws the flow through the return channel 10 providing it back to the container 2. By regulating the volume metric flow rate through supply pump 9 and return pump 11, the amount of suspension fluid that will be ejected from the print head 4 for printing can be precisely controlled. This flow regulated solution works well in many embodiments. However, as an alternative or even in addition, other embodiments may include a pressure regulated solution to regulate the amount of suspension fluid released from the nozzles.

In a pressure regulated embodiment, the supply pump 9 applies a (pre-determinable or preset) pressure P1 in the supply channel 8. Pressure drop across the shear section 40, as well as the pressure drop across the return channel 10 can be calculated if the pressure in container 2 is known. The pressure drop across the nozzle is thereby known, assuming a fixed aperture size of the nozzle outlet 20. This pressure drop equals the pressure in the nozzle chamber 18 downstream the shear section 40 and upstream the return outlet 16. As a result, the amount of suspension fluid released through the nozzle outlet 20 is also known.

However, in case of any disturbance or a blocking (e.g. caused by pollution in the nozzle 5 or in any channel downstream supply pump 9), the pressures in various parts of the system may change. Therefore, in accordance with an embodiment applying pressure regulation, the return channel or any other section downstream the nozzle chamber 18, may comprise a dynamic pressure regulation unit. This pressure regulation unit may passively or actively regulate the downstream pressure in the return channel in such a manner as to keep the pressure inside the nozzle chamber 18 downstream the shear section 40 constant (or at least substantially constant, dependent on the level of control desired). As a result, using the pressure regulator (not shown in the figures) in the return channel, the amount of suspension fluid can be accurately controlled.

It is noted that a flow regulated system and a pressure regulated system respond differently to an obstruction of the nozzle. In a flow regulated system, the total flow through the nozzle is kept constant, hence an obstruction of the nozzle causes an increase of the pressure inside the nozzle chamber 18. In a pressure regulated solution, the pressure is kept constant, hence an obstruction of the nozzle is compensated by the pressure regulator. In a pressure regulated multi-nozzle system or a nozzle chamber with multiple nozzle outlets, one obstructed nozzle outlet will thus have no effect on the flow through the remaining nozzle outlets. In a pressure regulated single nozzle system, obstruction of the nozzle causes the system to stop ejecting droplets. In a flow regulated multi nozzle system or a nozzle chamber with multiple nozzle outlets, one obstructed nozzle outlet will cause the flow through the other nozzles to increase. In a flow regulated single nozzle system, a (partial) obstruction of the nozzle outlet will increase the pressure inside the nozzle chamber 18, and thereby causing the nozzle outlet to un-block.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. Print head for printing a suspension fluid comprising particles, the print head comprising a nozzle having one or more nozzle outlets for allowing the suspension fluid to be ejected from the nozzle, a flow path including a supply channel for supplying the suspension fluid to the one or more nozzle outlets, and a supply pump for establishing a flow within the flow path, wherein the nozzle further comprises an actuator for imparting pressure fluctuations on the suspension fluid at the one or more nozzle outlets for generating one or more droplets therefrom, wherein the flow path further comprises a shear section for locally increasing the shear rate at least at a location in the flow path upstream of the one or more nozzle outlets, and a return channel for allowing excess fluid not ejected from the nozzle to flow away from the one or more nozzle outlets, wherein the shear section is configured to locally increase the shear rate for imposing a shear force on said particles which is larger than an attractive force between said particles in a particle agglomeration, wherein at least one of the one or more nozzle outlets is located in a wall of a branch channel extending from the supply channel.

2. Print head according to claim 1, wherein the shear section comprises at least one element of a group comprising: a flow constriction; a channel reduction of the supply channel, the channel reduction reducing at least one dimension of the supply channel; a structure present in said supply channel, such as a rim, wall, or protrusion; a bend in the supply channel.

3. Print head according to claim 1, wherein at least one of the one or more nozzle outlets is located in a wall of the supply channel, and wherein the supply channel is connected to the return channel.

4. Print head according to claim 1, wherein at least one of the one or more nozzle outlets is located in a nozzle chamber which is connected to the supply channel for receiving the suspension fluid, the nozzle chamber comprising the actuator for imparting the pressure fluctuations.

5. Print head according to claim 4, wherein the nozzle chamber is connected to the supply channel via a branch channel extending from the supply channel, the nozzle chamber being sized or shaped for imparting said pressure fluctuations.

6. Print head according to claim 1, wherein the branch channel connecting the one or more nozzle outlets to the supply channel extends from an inner bend of a bended portion of the supply channel.

7. Print head according to claim 4, wherein the nozzle chamber is arranged between an outlet portion of the supply channel and an inlet portion of the return channel.

8. Print head according to claim 7, wherein the nozzle chamber is shaped having a broad central section and narrow end sections, wherein each one of the outlet portion of the supply channel and the inlet portion of the return channel is located in a respective end section of the nozzle chamber.

9. Print head according to claim 8, wherein multiple of the one or more nozzle outlets are located distributed across the width of the central section.

10. Print head according to claim 1, further comprising a return pump cooperating with the supply pump for controlling a volumetric flow rate ejected from the one or more nozzle outlets.

11. Print head according to claim 1, further comprising a pressure regulator unit downstream of the nozzle chamber outlet cooperating with the supply pump for controlling a pressure in the nozzle near the one or more nozzle outlets.

12. Printing apparatus for printing a suspension fluid, the apparatus comprising a print head according to claim 1, wherein the supply channel of the flow path is connected to a fluid container for receiving the suspension fluid, and wherein the return channel is connected to the fluid container for releasing therein the excess suspension fluid.

13. Method of printing a suspension fluid comprising particles using a print head, the print head comprising a nozzle having one or more nozzle outlets, a supply pump, and a flow path comprising a supply channel, the method comprising:
 supplying, through the supply channel, the suspension fluid to the one or more nozzle outlets, using the supply pump for establishing a flow through the supply channel;
 ejecting, by the nozzle, the suspension fluid from the one or more nozzle outlets, while simultaneously imparting, by an actuator comprised by the nozzle, pressure fluctuations on the suspension fluid at the one or more nozzle outlets for generating one or more droplets therefrom,
 locally increasing the shear rate in the supply channel upstream of the one or more nozzle outlets using a shear section, wherein the shear rate is increased for imposing a shear force on said particles which is larger than an attractive force between said particles in a particle agglomeration, and
 removing from the one or more nozzle outlets excess fluid not ejected from the nozzle using a return channel.

14. Method of manufacturing a print head for printing suspension fluids comprising particles, the method comprising: providing a nozzle having one or more nozzle outlets for allowing the suspension fluid to be ejected from the nozzle; providing a flow path including a supply channel for allowing supply of the suspension fluid to the one or more nozzle outlets; providing a supply pump for enabling to establish a flow within the flow path; and providing an actuator within the nozzle for enabling to impart pressure fluctuations on the suspension fluid at the one or more nozzle outlets for generating one or more droplets therefrom;
 wherein the flow path is provided comprising a shear section for enabling local increasing of the shear rate at least at a location in the flow path upstream of the one or more nozzle outlets, the shear section being configured to locally increase the shear rate for imposing a shear force on said particles which is larger than an attractive force between said particles in a particle agglomeration, and wherein the flow path is further provided comprising a return channel for allowing excess fluid not ejected from the nozzle to flow away from the one or more nozzle outlets.

15. Method according to claim 14, wherein at least one of the one or more nozzle outlets is provided such as to be located in a nozzle chamber which is connected to the supply channel for receiving the suspension fluid, the nozzle chamber comprising the actuator for imparting the pressure fluctuations.

16. Method according to claim 15, wherein the nozzle chamber is provided such as to be connected to the supply channel via a branch channel extending from the supply channel, the nozzle chamber being sized or shaped for imparting said pressure fluctuations; and
 wherein the branch channel connecting the one or more nozzle outlets to the supply channel is provided such as to extend from an inner bend of a bended portion of the supply channel.

17. Method according to claim 15, wherein the nozzle chamber is provided to arranged between an outlet portion of the supply channel and an inlet portion of the return channel;
 wherein the nozzle chamber is shaped having a broad central section and narrow end sections, wherein each one of the outlet portion of the supply channel and the inlet portion of the return channel is located in a respective end section of the nozzle chamber; and
 wherein multiple of the one or more nozzle outlets are provided to be located distributed across the width of the central section.

18. Method according to claim 13, wherein at least one of the one or more nozzle outlets is provided such as to be located in a nozzle chamber which is connected to the supply channel for receiving the suspension fluid, the nozzle chamber comprising the actuator for imparting the pressure fluctuations.

19. Method according to claim 18, wherein the nozzle chamber is provided such as to be connected to the supply channel via a branch channel extending from the supply channel, the nozzle chamber being sized or shaped for imparting said pressure fluctuations; and
 wherein the branch channel connecting the one or more nozzle outlets to the supply channel is provided such as to extend from an inner bend of a bended portion of the supply channel.

20. Method according to claim 18, wherein the nozzle chamber is provided to arranged between an outlet portion of the supply channel and an inlet portion of the return channel;
 wherein the nozzle chamber is shaped having a broad central section and narrow end sections, wherein each one of the outlet portion of the supply channel and the inlet portion of the return channel is located in a respective end section of the nozzle chamber; and wherein multiple of the one or more nozzle outlets are provided to be located distributed across the width of the central section.

\* \* \* \* \*